Nov. 20, 1934.   L. G. BOSTWICK   1,981,686
VIBRATION TRANSLATING SYSTEM
Filed Sept. 18, 1931
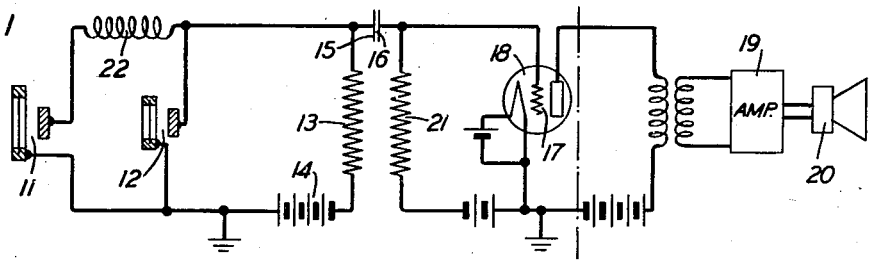
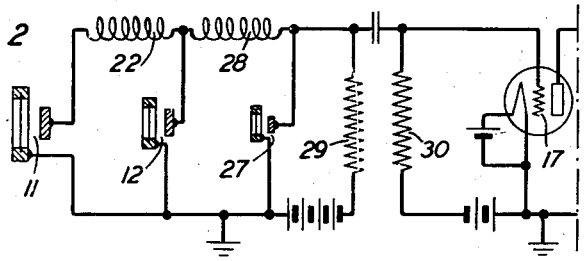
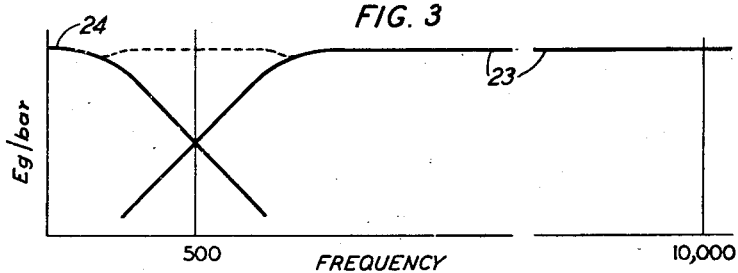
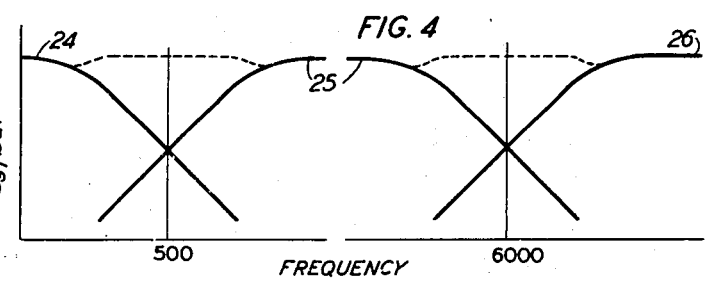
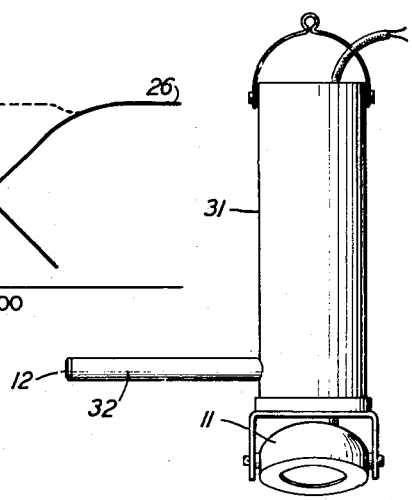
INVENTOR
L. G. BOSTWICK
BY
ATTORNEY Patented Nov. 20, 1934

1,981,686

UNITED STATES PATENT OFFICE 1,981,686

VIBRATION TRANSLATING SYSTEM

Lee G. Bostwick, Chatham, N. J., assignor to Bell Telephone Laboratories, Incorporated, New York, N. Y., a corporation of New York Application September 18, 1931, Serial No. 563,560

2 Claims. (Cl. 179—1)

This invention relates to sound frequency translating systems and more particularly to those in which the dimensions of the sound pickup device are correlated to the sound frequency range to be covered so that distortionless translation is obtained throughout the whole range.

It is well known in the art that if the pick-up device is small as compared with the wave lengths of the frequencies to be translated it is a case of ordinary Laplacian flow of air past an irregular object and the pressure on the diaphragm is practically the same as that in the undisturbed field, while if the diaphragm is of infinite size the pressure, due to reflection effects, will be double that value for all frequencies. For pick-ups within the range of practical dimensions a transition from the first to the second of these conditions occurs giving an increase of 6 decibels in response over part of the range of interest.

In a copending application of P. B. Flanders and H. C. Harrison, Serial No. 489,846, filed October 20, 1930, there is disclosed a condenser transmitter of such small dimensions that with it this pressure doubling effect is less objectionable since it occurs near the upper limit of the range of interest.

Such a transmitter is capable of very uniform response over a wide range of frequency as, for example, up to 10,000 cycles per second, but for proper operation it requires coupling resistances of very high value such as 200 megohms for connecting it to its associated amplifier. One disadvantage of a high impedance circuit of this type is that it is inherently more susceptible to extraneous interference than one of lower impedance. Moreover, these resistances are apt to be of unstable value in service and when these variations occur additional objectionable noise is introduced into the system.

It is the object of this invention to obtain a uniform frequency response over a wide range without the use of an amplifier having such high impedance.

According to the preferred embodiment of the invention a very small transmitter is associated with an amplifier having coupling resistances of only moderate values. Such an arrangement does not distort the sound field and functions quite satisfactorily over the greater part of the range but is not responsive to a portion of the low frequency band. There is accordingly provided a second transmitter of large dimensions and capacity which is capable of functioning properly at low frequencies with the amplifier of low input impedance. By properly proportioning the capacities of the transmitters and the resistances of the amplifier and by the addition of suitable means, such as a high inductance, the range of frequencies may be divided between the transmitters to give uniform response over the desired frequency band with an amplifier having such coupling resistances that there is no trouble due to unstability in its operation.

The two transmitters are mounted in such relation to each other as to be in substantially the same sound field, that is they should not be spaced more than the length of a quarter wave at the cross-over frequency but the small transmitter is preferably outside the area of disturbance caused by the presence of the large transmitter.

Three or more transmitters may be used, if desired, and the frequency range to be covered may be divided between them in the same manner as will be described more in detail below.

In the drawing, Fig. 1 illustrates the invention as applied to a circuit using two transmitters;

Fig. 2 is a similar circuit using three transmitters;

Fig. 3 shows the frequency range covered by each transmitter of Fig. 1;

Fig. 4 shows how the range is apportioned between the three transmitters of Fig. 2; and Fig. 5 illustrates one arrangement for mounting the transmitters.

Referring now to Fig. 1, the condenser transmitters 11 and 12 are supplied with polarizing potential through a high resistance 13 from a high voltage source 14. When subjected to varying sound pressures the capacities of these devices will vary and cause corresponding variations in the potential of plate 15 of the coupling condenser 16. The grid 17 of the vacuum tube 18 will, therefore, fluctuate in potential and the tube will amplify these fluctuations in the well known manner. The alternating currents in the output circuit of the tube 18 are then further amplified by a suitable amplifier 19 which delivers its output to a receiving device 20 which may be a loud speaker, recorder or any other desired mechanism.

The circuit briefly described above is well known in the art except for the use of the multipled condenser transmitters 11 and 12. The transmitter 12 is of the type disclosed in the application referred to above, that is, of very small dimensions preferably about one half inch in diameter so as to have substantially constant response for frequencies up to about 10,000 cycles per second. The transmitter 11 may be of a type now in common use, the general features of which are described in Patent 1,333,744 to E. C. Wente, March 16, 1920. Such transmitters are about three inches in diameter and are found to function very satisfactorily over the lower range of frequencies when coupled to their associated amplifiers with resistances as low as 17 megohms.

In Fig. 1, resistances 13 and 21 are of approximately this value so that transmitter 11 is effective to cause the system to be properly responsive to low frequencies. Some means must be provided, however, to prevent this transmitter from operating the receiving device over the high frequency range where its response is unsatisfactory. In Fig. 1 this takes the form of a high inductance 22, the constants of which are properly correlated to the rest of the circuit to render the device ineffective above some desired crossover frequency. With a system of the type described, the transmitter 12 will have a flat response for all frequencies down to about 500 cycles per second as indicated by curve 23 of Fig. 3. The low frequency cut-off is due to the resistances 13 and 21 being relatively small as compared with the value which would be required if this transmitter were being used alone over the whole range. The value of inductance 22 must therefore be chosen to cause the characteristic curve 24 of transmitter 11 to droop as indicated so that the voltage on the grid 17 ($E_g$) per bar of air pressure on the transmitter diaphragms will be a constant over the whole range of interest. For the system described the inductance required would be of the order of 4000 henries but the exact value for best results could of course be more accurately determined by experiment in each case. While this is a very large inductance, it should be remembered that while the polarizing potential is about 200 volts, the generated voltage ($E_g$) is only about .001 volt and that the current through the inductance is determined by this alternating voltage and not by the polarizing potential. Since the transmitter 11 has a capacity of about 300 micromicrofarads which is in series with the inductance and resistance 13, the current through the inductance is of the order of $10^{-9}$ ampere. Hence, if it is built with a permalloy core such an inductance can readily be made at least as small as the transmitter 11 and arranged to avoid undue disturbance to the sound field in which it is placed.

If it is desired to use three or more transmitters in multiple each responsive to a selected portion of the frequency scale, this may be done in accordance with Fig. 2. In this case transmitter 11 might be adapted to respond up to 500 cycles as before, transmitter 12 to a range extending between 500 and 6000 cycles as shown by curve 25 of Fig. 4 and a third transmitter 27 would be utilized for the higher portion of the range as shown by curve 26. The desired high frequency cut-off for transmitter 12 would be obtained by using a second inductance 28 of much lower value than inductance 22 due to the higher cut-off frequency required. As before the value of this second inductance would be such as to compensate for the drooping of curve 26 which is determined by the relation of the capacity of condenser 27 to the values of resistances 29 and 30.

Fig. 5 shows one arrangement for utilizing the invention in which the small transmitter 12 is added to the usual mounting for the large transmitter 11. This mounting is illustrated and fully described in an article "The Electrical Engineering of Sound Picture Systems" by K. F. Morgan and T. E. Shea in the Transactions of the American Institute of Electrical Engineers, vol. 49, January, 1930. As shown in the drawing, the transmitter 11 is pivotally connected to the casing 31 which contains the vacuum tube 18 and its associated apparatus. The small transmitter 11 is mounted on the outer end of a tube 32 projecting from the casing about six inches so that the transmitter is operating in a substantially undistorted sound field. As pointed out in the above article the casing may be mounted on a floor stand or supported above the sound source as desired. If a third transmitter is used it can be similarly connected to the casing by a tube of suitable size and length and in either case the one or more inductances required can be housed within the casing 31.

It will be understood that the various values of resistance, inductance and capacity given are supplied purely for purposes of illustrating how condenser transmitters may be used in multiple to cover a wide range of frequencies, that the invention is independent of any specific arrangement and should be limited only by the scope of the following claims.

What is claimed is:

1. In a sound translating system, the combination of a large condenser transmitter, a small condenser transmitter, an amplifier common to the transmitters and having an input impedance correlated to the impedance of the transmitters so as to give suitable response at low frequencies for the large transmitter but not for the small transmitter, and filter means for confining the response of the large transmitter to the low frequency range.

2. A sound translating system according to claim 1 in which the amplifier input and filter impedances are so proportioned that the sum of the responses of the two transmitters is substantially a constant over the whole frequency range of the system.

LEE G. BOSTWICK.